United States Patent
Lin (10) Patent No.: US 8,665,370 B2
(45) Date of Patent: Mar. 4, 2014

(54) METHOD FOR SYNCHRONIZED PLAYBACK OF WIRELESS AUDIO AND VIDEO AND PLAYBACK SYSTEM USING THE SAME

(75) Inventor: Kao-Min Lin, New Taipei (TW)

(73) Assignee: AmTRAN Technology Co., Ltd., New Taipei (TW)

( * ) Notice: Subject to any disclaimer, the term of this patent is extended or adjusted under 35 U.S.C. 154(b) by 68 days.

(21) Appl. No.: 13/242,526

(22) Filed: Sep. 23, 2011

(65) Prior Publication Data

US 2012/0206650 A1 Aug. 16, 2012

(30) Foreign Application Priority Data

Feb. 16, 2011 (TW) .............................. 100105155 A (51) Int. Cl.
- H04N 9/475 (2006.01)
- H04L 1/08 (2006.01)
- H04N 7/26 (2006.01)
- H04W 56/00 (2009.01)

(52) U.S. Cl.
USPC ........................ 348/515; 370/350; 375/240.28

(58) Field of Classification Search
USPC ........................ 348/515, 738; 381/59, 79, 300, 381/303–307, 309–311; 370/350, 516, 503, 370/508, 218, 517, 216, 331, 332, 338, 370/519; 725/81; 455/3.06; 375/240.27, 375/240.28
See application file for complete search history.

(56) References Cited

U.S. PATENT DOCUMENTS

| | | | | |
|---|---|---|---|---|
| 5,596,420 A | * | 1/1997 | Daum | 386/241 |
| 5,598,352 A | * | 1/1997 | Rosenau et al. | 715/203 |
| 5,815,634 A | * | 9/1998 | Daum et al. | 386/203 |
| 6,026,506 A | * | 2/2000 | Anderson et al. | 714/746 |
| 6,993,251 B1 | * | 1/2006 | Phillips et al. | 386/207 |
| 2003/0121043 A1 | * | 6/2003 | Reinold et al. | 725/62 |
| 2007/0286276 A1 | * | 12/2007 | Gartner et al. | 375/240.01 |
| 2008/0040759 A1 | * | 2/2008 | She et al. | 725/81 |
| 2008/0291863 A1 | * | 11/2008 | Agren | 370/315 |
| 2008/0291891 A1 | * | 11/2008 | Jerlhagen et al. | 370/350 |
| 2009/0238375 A1 | * | 9/2009 | Pilati et al. | 381/79 |
| 2010/0202334 A1 | * | 8/2010 | Soliman et al. | 370/311 |
| 2010/0232618 A1 | * | 9/2010 | Haartsen et al. | 381/80 |
| 2012/0101814 A1 | * | 4/2012 | Elias | 704/207 |

* cited by examiner

Primary Examiner — Victor Kostak
(74) Attorney, Agent, or Firm — Alston & Bird LLP (57) ABSTRACT

A method for synchronized playback of wireless audio and video is applicable to a playback system. The method for synchronized playback includes steps of receiving and processing multimedia data by the playback system, in which the multimedia data includes video data and audio data; wirelessly transmitting the audio data to a loudspeaker and meanwhile holding the video data for a threshold time; and finishing the transmission of the audio data when the threshold time is reached, so that the video data and the corresponding audio data are synchronously played. The method for synchronized playback can control the delay caused by the wireless audio transmission, thus achieving the objective of synchronously playing the audio and video data.

20 Claims, 4 Drawing Sheets

METHOD FOR SYNCHRONIZED PLAYBACK OF WIRELESS AUDIO AND VIDEO AND PLAYBACK SYSTEM USING THE SAME

CROSS-REFERENCE TO RELATED APPLICATIONS

This non-provisional application claims priority under 35 U.S.C. §119(a) on Patent Application No(s). 100105155 filed in Taiwan, R.O.C. on Feb. 16, 2011, the entire contents of which are hereby incorporated by reference.

BACKGROUND OF THE INVENTION

1. Field of Invention

The present invention relates to a playback method for multimedia data and a playback system using the same, and more particularly to a synchronized playback method for playing video data and audio data and a playback system using the same.

2. Related Art

While the quality requirement of audio and video is raised, multimedia playback systems (for example, a television, a personal computer, or a personal mobile device . . . etc) have become an important topic to modern people. The multimedia content presented by the multimedia playback system shows abundant video and audio effects to the audience, and therefore, the vivid multimedia content easily roots in the heart of the audience.

Generally speaking, when a Content Provider provides multimedia data to a receiving device, the multimedia data is constituted of contents including video contents and audio contents. The multimedia data is generally transmitted in packets over networks. After the receiving device receives the multimedia data, the video and audio contents have to be processed by different decoding procedures separately and then synchronized, so the video and audio contents can be synchronously played by the playback system. However, the quality of audio and video playback may be affected when the multimedia data is played in a specific work environment, for example, when a wireless loudspeaker is utilized in the playback system. The reason lies in that, when the processed audio data packets are transmitted to the wireless loudspeaker through a Wireless Local Area Network (WLAN), packet loss may occur in the wireless network due to interference, and thus the quality of audio playback is affected; or the wireless loudspeaker cannot play the audio data in sequence unless the audio packets of the audio data are all received by the wireless loudspeaker through the WLAN and temporarily stored, thus resulting in asynchronous delays of audio playback relative to the video playback.

In order to avoid the influence of packet loss during wireless transmission, the prior art has disclosed a method for reducing or compensating data loss during wireless transmission by increasing a buffer size. However, although such method can make up for the data loss during the wireless transmission, the method also requires longer processing time while the buffer size is increased. So the problem of unsynchronized video and audio playback may be further worsened if the prior art is applied to a multimedia playback system with wireless loudspeaker.

Therefore, it is an urgent issue for those skilled in relevant arts to provide a method for synchronously playing the multimedia data after wireless audio transmission and provide a playback system using the same capable of lossless audio transmission.

SUMMARY OF THE INVENTION

Accordingly, the present invention is a method for synchronized playback of multimedia data and a playback system using the same, so as to solve the problems in the prior art of wireless playback system.

The present invention provides a method for synchronized playback of multimedia data, which comprises the following steps. A playback system receives and processes multimedia data which comprises video data and audio data. Before playing the multimedia data, the playback system wirelessly transmits the initial part of the audio data to a wireless loudspeaker, and meanwhile holds the initial part of the video data for a threshold time. The playback system starts to play the initial part of the video data when the threshold time is reached, and at the same time, the wireless loudspeaker starts to play the received initial part of the audio data, and continues to receive the subsequent audio data from the playback system, so that the video data and the audio data can be synchronously and continuously played without interruption.

According to an embodiment of the present invention, the video data is displayed on a display device, and the audio data is received and played on a loudspeaker. When the playback system wirelessly transmits the audio data to the loudspeaker, the audio data is encapsulated or packetized into at least one packet, and the packet conforms to the Real Time Transport Protocol (RTP).

According to an embodiment of the present invention, the wireless transmission of the playback system and the loudspeaker is complied with an IEEE 802.11 communication standard.

According to an embodiment of the present invention, the threshold time where the playback system holds the video data is about equal to the time needed to transmit the audio data from the display device to the loudspeaker for playing, and the time can be predetermined.

According to an embodiment of the present invention, the display device comprises a video buffer, a first audio buffer and a wireless transmitter. The video buffer is used to temporarily hold the video data in the multimedia data, the first audio buffer is used to collect the audio data and encapsulate or packetize the audio data into at least one packet, and the wireless transmitter is used to wirelessly transmit the at least one packet of the audio data to the loudspeaker.

According to an embodiment of the present invention, the loudspeaker comprises a wireless receiver, a second audio buffer and an audio player. The wireless receiver is used to receive the audio data transmitted by the wireless transmitter; the second audio buffer is coupled with the wireless receiver, and is used to collect and temporarily store the audio data output from the wireless receiver; and the audio player is coupled with the second audio buffer, and is used to receive the audio data output from the second audio buffer and play the corresponding audio accordingly.

According to an embodiment of the present invention, the wireless receiver is electrically connected to the second audio buffer through an Integrated Inter-chip Sound (I2S) interface.

According to an embodiment of the present invention, the audio data is collected by the display device and is transmitted to the wireless transmitter in a first period of time, the audio data is transmitted from the wireless transmitter to the wireless receiver in a second period of time, the audio data is collected by the wireless receiver and transmitted to the second audio buffer in a third period of time, and the audio data is transmitted from the second audio buffer to the audio player to output in a fourth period of time. The first period of time is equal to the third period of time, and the sum of the first period of time, the second period of time, the third period of time and the fourth period of time is equal to the threshold time.

According to an embodiment of the present invention, when the display device wirelessly transmits the audio data, the audio data is encapsulated or packetized into a plurality of data packets, and the data packets are repeatedly transmitted in a specific sequence.

According to an embodiment of the present invention, when at least one data packet is lost, the playback system utilizes an algorithm to reconstruct the audio data or compensate for the lost data packet.

The present invention further provides a system for synchronized playback of multimedia data, which comprises a display device and a loudspeaker. The display device is used to receive and process multimedia data, in which the multimedia data comprises video data and audio data. In one embodiment, the display device may have a multimedia data module to receive and process multimedia data. The display device processes and temporarily stores the video data in a buffer for a threshold time before playback. In the meanwhile the display device encapsulates or packetizes the audio data and transmits the audio data to the loudspeaker through a wireless network. The loudspeaker wirelessly receives the audio data transmitted by the display device and plays the audio data. The display device plays the video data when the threshold time is reached, and the loudspeaker also finishes receiving the audio data substantially at the same time, so that the display device and the loudspeaker synchronously play the video data and the audio data.

According to an embodiment of the present invention, the display device holds the video data for the threshold time before playing, and the time for transmitting the audio data from the display device to the loudspeaker for playing is substantially equal to the threshold time.

Thus, through the method for synchronized playback of multimedia data and the playback system using the same according to the embodiments of the present invention, not only the delay of playing the multimedia data can be controlled in a certain range, but also the playback system can achieve the objective of synchronously playing the multimedia data.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

The detailed features and advantages of the present invention are described below in great detail through the following embodiments, the content of the detailed description is sufficient for those skilled in the art to understand the technical content of the present invention and to implement the present invention there accordingly. Based upon the content of the specification, the claims, and the drawings, those skilled in the art can easily understand the relevant objectives and advantages of the present invention.

Figure 1:
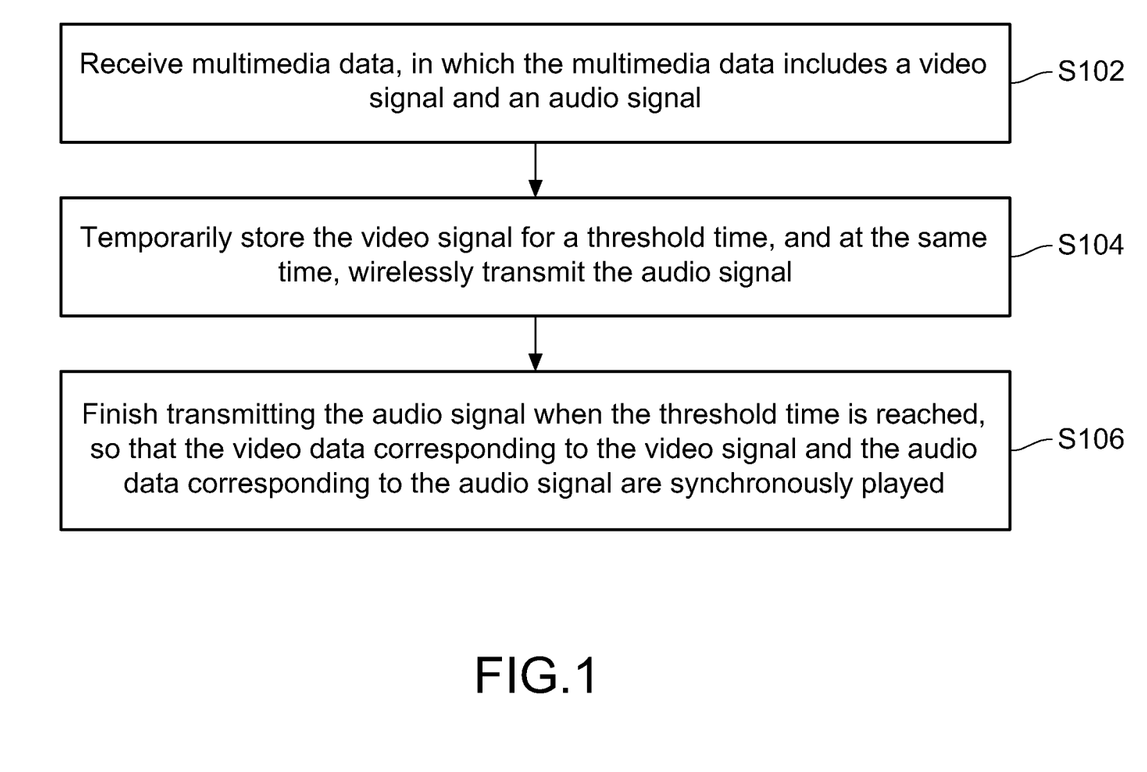
FIG. 1 is a flow chart of steps of a method for synchronized playback of multimedia data according to an embodiment of the present invention.

FIG. 1 is a flow chart of steps of a method for synchronized playback of multimedia data according to an embodiment of the present invention. The method may be applied to a playback system 10 in FIG. 2. The playback system 10 can synchronize the playback of audio and video data by utilizing the method of the present invention. Technical features of the method for synchronized playback of multimedia data of the present invention are illustrated below with reference to FIGS. 1 and 2.

As shown in FIG. 1, the method for synchronized playback of multimedia data according to the embodiment of the present invention mainly comprises the following steps.

At Step S102, the playback system receives multimedia data comprising video data and audio data. The playback system needs to process the multimedia and retrieve the video data and the audio data before playing. If the multimedia data is encoded, the playback system also needs to decode the multimedia data.

At Step S104, before playing the multimedia data, the playback system wirelessly transmits the initial part of audio data to a wireless loudspeaker. In the meanwhile the playback system holds the initial part of video data for a threshold time before playing. The playback system packetizes the audio data, i.e., encapsulates the audio data into packets, for wireless transmission. In an embodiment of the present invention, the playback system collects the audio data, scatters and re-arranges the sequence of the audio data, and then transmits the packets of the audio data.

At Step S106, the playback system starts to play the video data when the threshold time is reached. At the same time, the wireless loudspeaker starts to play the audio data after finishing receiving the initial part of the audio data. Thus, the video data and the corresponding audio data are synchronously played.

Figure 2:
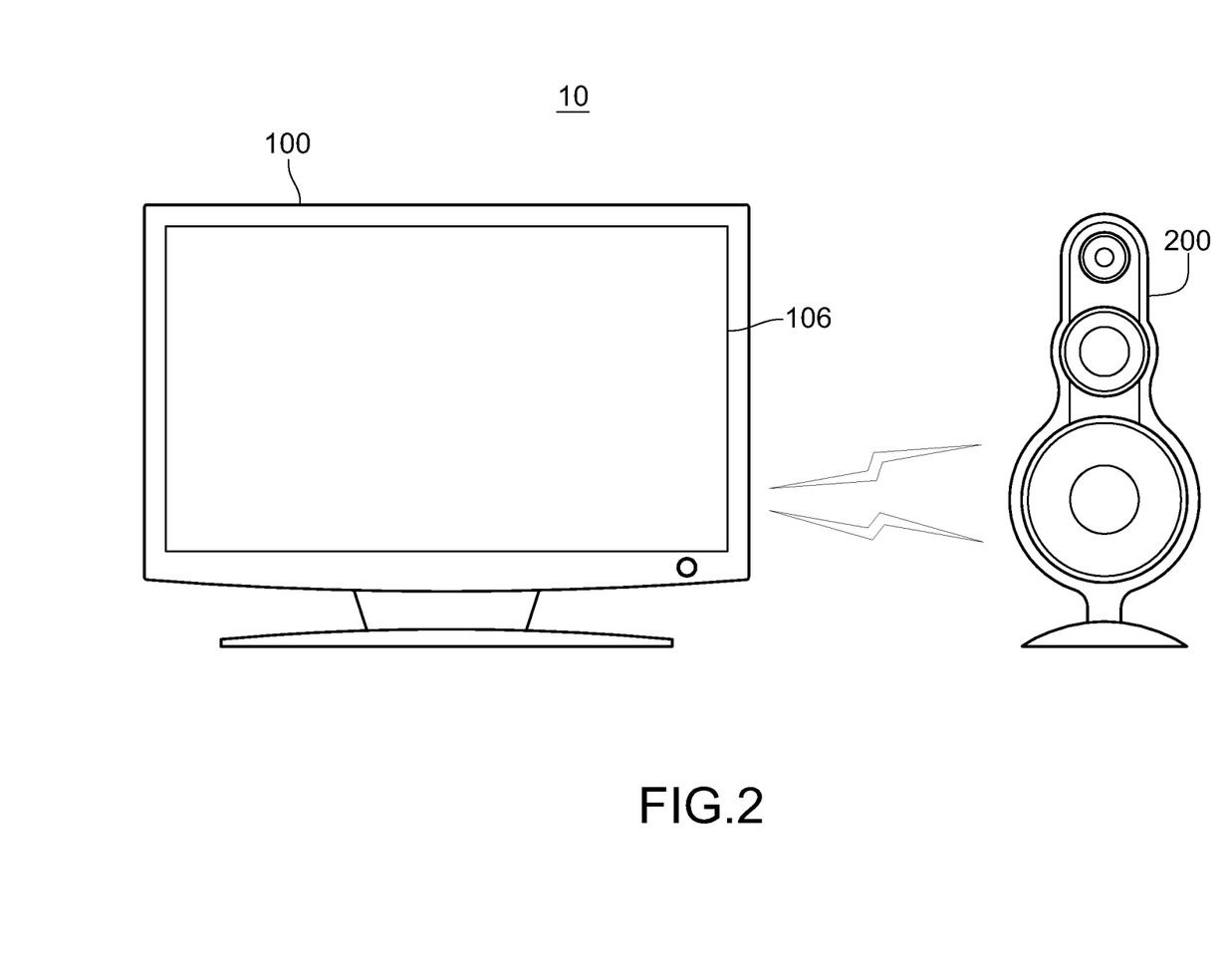
FIG. 2 is a schematic view of a playback system according to an embodiment of the present invention.

The playback system 10 illustrated in FIG. 2 is capable of receiving and processing the multimedia data (or referred to as audio-visual data), which is composed of video data and audio data. The playback system 10 comprises a display device 100 and a loudspeaker 200, in which the display device 100 has a screen display 106 for playing the video data. For example, the display device 100 may be a video playback device such as a television, and the loudspeaker 200 may be a wireless audio playback device such as a wireless speaker. The display device 100 and the loudspeaker 200 form a communication system capable of performing wireless signal transmission through a WLAN. The playback system may also comprise other multimedia related devices, such as an optical disk player, a set-top box, or a sound amplifier, which may be connected to the display device 100 and the loudspeaker 200 wirelessly and capable of receiving, collecting, providing or transmitting the multimedia data to the display device 100 and the loudspeaker 200 for playing. The display device is not limited to a television, but also could be a personal computer, a mobile phone, a portable game console, or a personal mobile device in other embodiments of the present invention.

When the playback system 10 receives the multimedia data (or referred to as audio-visual data) from a Content Provider or a Multimedia On Demand system, the video data in the multimedia data will be temporarily stored in the display device 100, and the audio data in the multimedia data will be transmitted to the loudspeaker 200.

Figure 3:
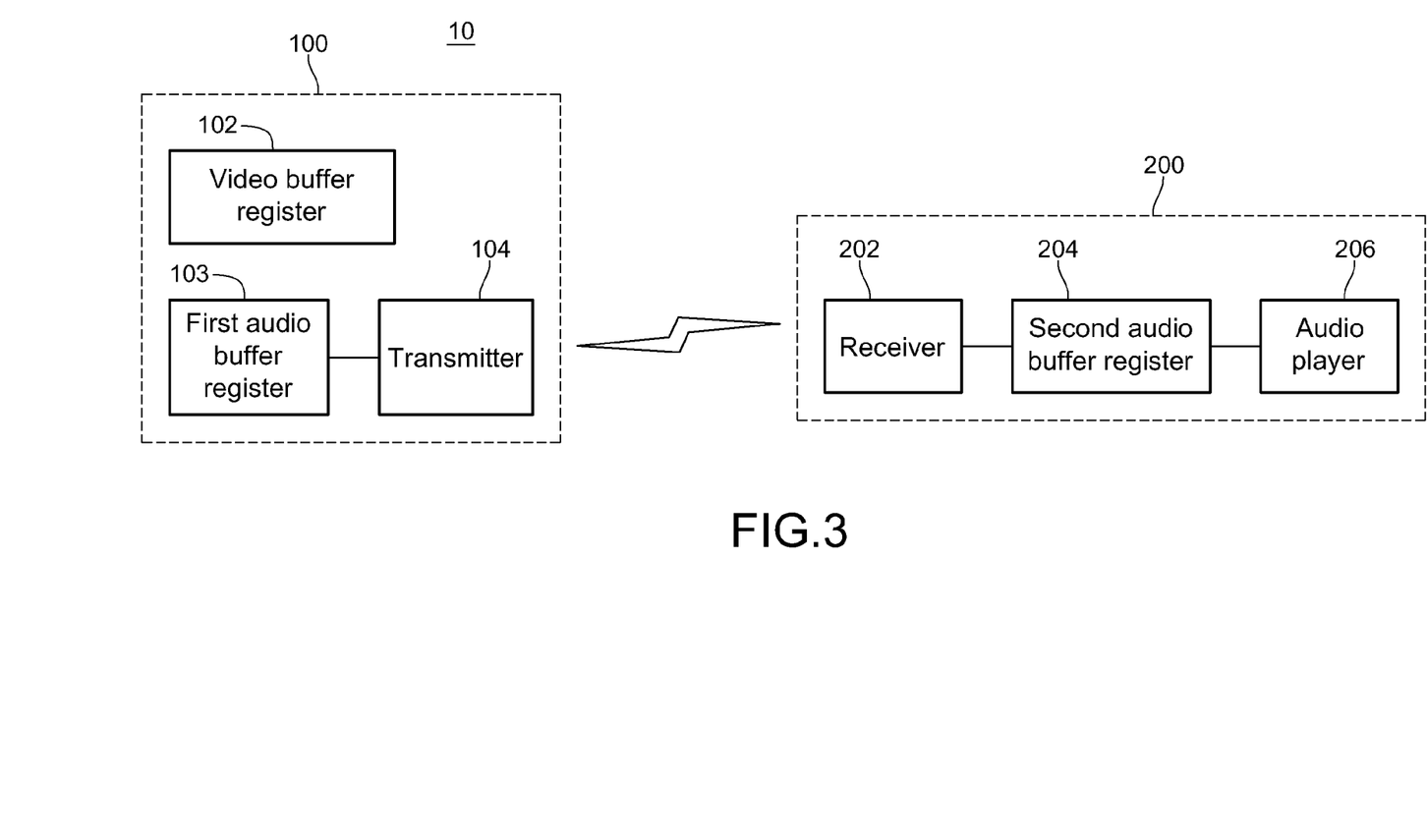
FIG. 3 is an architectural view of a playback system according to an embodiment of the present invention.

FIG. 3 is an architectural view of a playback system according to an embodiment of the present invention. In detail, the display device 100 comprises a video buffer 102, a first audio buffer 103 and a transmitter 104. The video buffer 102 is used to temporarily store the video data and hold it for a threshold time. When the video data is temporarily stored in the video buffer 102, the first audio buffer 103 collects the audio data which is retrieved from the multimedia data and encapsulates the audio data into data packets. The transmitter 104 transmits the audio data packets encapsulated by the first audio buffer 103 to the loudspeaker 200 wirelessly. The buffer size of the video buffer 102 may vary with the specifications of the video data or the display device. For example, if the image resolution of each video frame in the video data is 1920*1080 pixels and each pixel is 24 bits data, and the video buffer 102 needs to temporarily store one to three frames of image data, the buffer size of the video buffer 102 have to be about 6 to 20 megabytes (MB).

The loudspeaker 200 comprises a receiver 202, a second audio buffer 204 and an audio player 206. One end of the receiver 202 is wirelessly connected to the transmitter 104, and the other end of the receiver 202 is electrically connected to the second audio buffer 204 through an I2S interface. Therefore, according to the embodiment of the present invention, when the transmitter 104 of the display device 100 transmits the data packets comprising audio data to the loudspeaker 200 wirelessly, the receiver 202 of the loudspeaker 200 receives the data packets transmitted by the transmitter 104. Afterwards, the audio data is retrieved from the data packets and temporarily stored in the second audio buffer 204. After the collection or receiving of the audio data is finished, the audio player 206 (for example, a loudspeaker such as a speaker or a sounder) receives the audio data from the audio buffer and plays the audio data. The receiver 202 may also be located in other wireless communication device, and the wireless communication device may be connected to the loudspeaker 200, so as to provide wireless receiving function to the loudspeaker 200 and transmit the received audio data to the loudspeaker 200.

Before the video data is played on the screen display 106, the video data is temporarily stored in the video buffer 102 until the threshold time is reached, and the audio data of the multimedia data is transmitted to the loudspeaker 200 in the meantime. The display device holds the playback of the video data for a threshold time after storing the video data. Therefore, according to the method for synchronized playback of multimedia data of the present invention, the display device 100 and the loudspeaker 200 can synchronously play the video data and the audio data, as long as the loudspeaker 200 finishes receiving the audio data and starts to play the audio data when the threshold time is reached. When the initial part of audio and video data is played, the subsequent part of audio data is transmitted to the loudspeaker 200 and will then be temporarily stored in the second audio buffer 204 for being subsequently played following the initial part by the audio player 206. Therefore, when the playing of the initial part of audio and video data is finished, the display device 100 can continue to play the subsequent part of the video data, and the loudspeaker 200 can also continue to play the subsequent part of the audio data. Thus, after starting to play the audio and video data, the playback system 10 can synchronously and seamlessly play the complete multimedia data without being interrupted for synchronization.

During the transmission of the audio data to the loudspeaker 200, the audio data is packetized, or encapsulated into at least one packet, conforming to the Real Time Transport Protocol (RTP). In this case, wireless transmission between the display device 100 and the loudspeaker 200 could be complied with IEEE 802.11 standard, which is capable of transmitting 20 megabits of data in one second generally. The audio data may also be transmitted complied with other wireless communication standards, such as Worldwide Interoperability for Microwave Access (WiMAX), 3GPP Long Term Evolution (LTE), or others.

Figure 4:
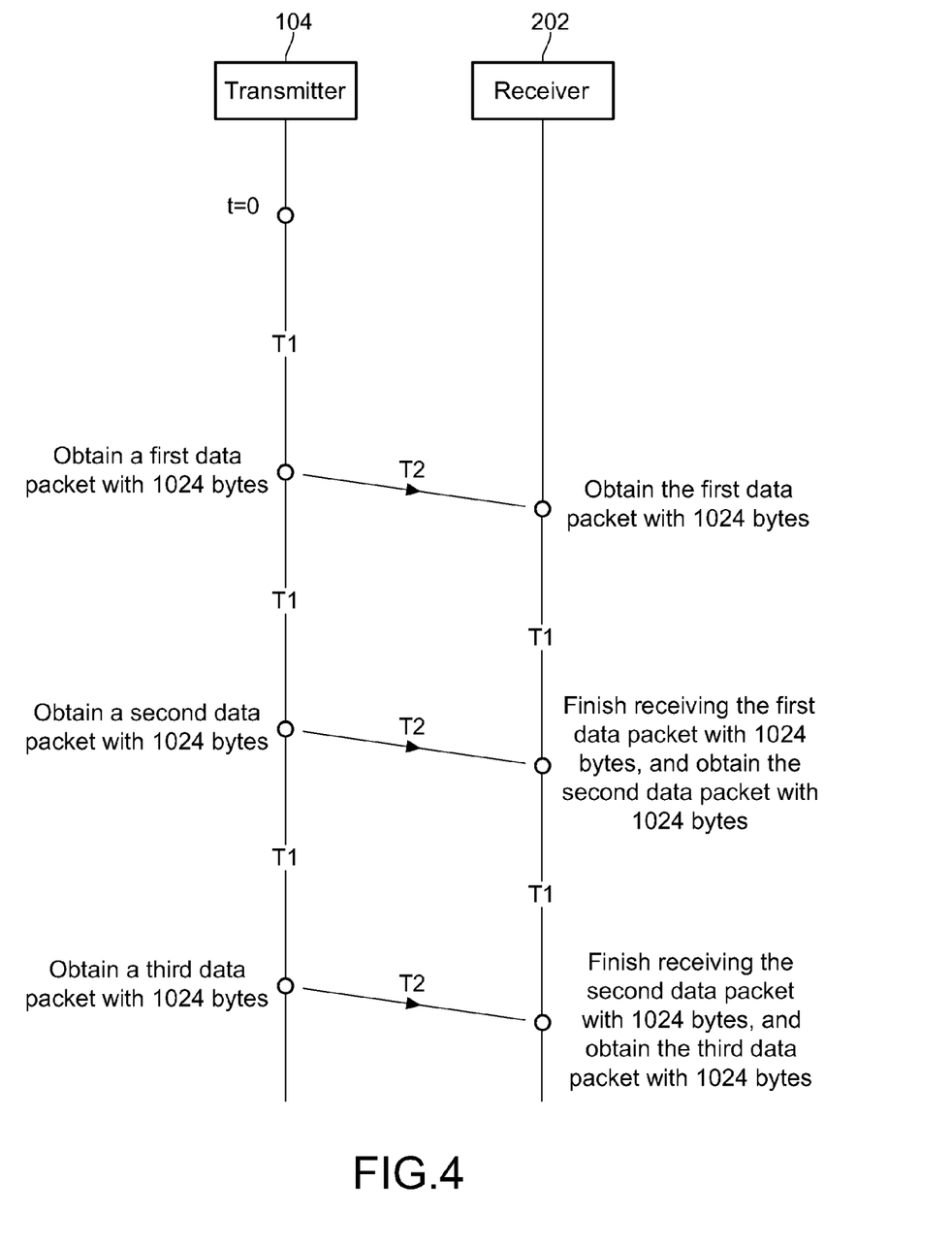
FIG. 4 is a timing chart of data transmission between a transmitter and a receiver of a playback system according to an embodiment of the present invention.

As shown in FIG. 4, there are four stages from preparing to transmit the audio data to playing the audio data in the playback system of the present invention. The required time is described in the following. Generally the audio data is formed by audio signals, and may be converted into different formats depending on requirements. Assuming that the audio data is formed of dual channel, 48000 Hertz (Hz) sampling rate, and 16-bit sampling depth Linear Pulse Code Modulation (LPCM) signals, the size of the audio data per second will be 48000*16*2 bits. With such audio format, a 4096-byte space will be defined in the first audio buffer 103 of the display device 100 so as to retrieve and collect the audio data. In order to finish collecting 4096 bytes of audio data and storing in the defined space, the first audio buffer 103 has to collect the audio data, which will take a first period of time $T_1$ that is (4096*8)/(48000*16*2) seconds, equal to about 21.3 milliseconds (ms). Then, the audio data can be encapsulated into packets and transmitted through the transmitter 104.

Afterwards, the audio data will be transmitted from the transmitter 104 to the receiver 202 in the stage of wireless transmission. Firstly, the audio data is encapsulated into data packets. Each of the data packets comprises part of the audio data up to 1024 bytes, an RTP Header with 12 bytes, an Internet Protocol (IP) header with 20 bytes, and a User Datagram Protocol (UDP) header with 8 bytes. Therefore, the size of the data packet is actually 1064 bytes during the transmission. If the bandwidth of the WLAN between the display device 100 and the loudspeaker 200 is 20 M bps, a second period of time $T_2$ is required for transmitting one data packet to the receiver 202, which is (1064*8)/(20M) seconds, about 3.4 ms.

Finally, when the audio data packet reaches the loudspeaker 200, the audio data cannot be played by the audio player 206 until the receiver 202 and the second audio buffer 204 finish the collection of audio packets and store them in the second audio buffer 204. The audio data packets are collected from the receiver 202 and stored in the second audio buffer 204. A third period of time $T_3$ is required for collecting and temporarily storing the data packets, which is about the same as the time $T_1$ (21.3 ms) required for collecting the audio data of the first audio buffer 103. After collection of the data packets is finished, the audio data still needs to be extracted from the packets and transmitted to the audio player 206 for playing. A fourth period of time $T_4$ is required for operation processing, which is about 1 ms. Therefore, the whole process from preparing to transmit the audio data to playing the audio data will cause a delay of $(T_1+T_2+T_3+T_4)$, equal to (21.3*2+3.4+1) ms, i.e., about 47 ms in total.

Therefore, according to the embodiment of the present invention, when the threshold time for temporarily holding the video data before being played by the display device 100 is set to 47 ms, i.e., the threshold time is equal to the delay time caused by the transmission of the audio data, the display device 100 and the loudspeaker 200 can synchronously play the video data and the corresponding audio data. Thus, the objective of synchronously playing the multimedia data is achieved. In order to hold the video data for 47 ms until being played, the playback system 10 needs to temporarily store the ready-to-play video data into the video buffer 102 for 47 ms. If the playback frequency of video is 60 frames per second, i.e., the playback time of each frame is about 16 ms, the delay of video playback for 47 ms will cause 3 frames of video data to be held. Accordingly, the video buffer 102 needs to have a buffer space capable of temporarily storing three frames.

In addition, processing of the video data in a playback system will generally take more time than the processing of the audio data because the size of the video data is larger than the audio data. Thus, when the audio data is not played by the wireless loudspeaker, the playback system 10 will delay the playing of the audio data for 10 ms to 30 ms, so as to synchronously play the audio and video data. When it comes to the audio data being played by the wireless loudspeaker, the playback system 10 will cancel the delayed time of the audio data, and thus the playback system 10 may wirelessly transmit the audio data to the loudspeaker 200 10 ms to 30 ms earlier. Therefore, the threshold time for holding the video data before playing can be further shortened, and the space of the video buffer 102 can be further reduced.

It should be noted that, the length of the exemplary time periods taken in the stages of receiving, temporarily storing and playing the corresponding data by the display device 100 and the loudspeaker 200 described above are not intended to limit the scope of the present invention. In other words, in other embodiments of the present invention, the length of the time (comprising the threshold time and the time $T_1$, $T_2$, $T_3$, and $T_4$) can be modified by a designer according to the mentioned parameters, such as the size of the audio buffer area in the playback system 10, the sampling rate or wireless transmission bandwidth, and all such modifications fall within the scope of the present invention.

In another embodiment, in order to avoid loss of the audio data packet during the wireless transmission process, the sequence of the audio data packets will be scattered and rearranged in an embodiment of the present invention. For example, when an audio sample is 16 bits of data, a dual channel sampling point will be 4 bytes of data, which is 2 (audio channels)*16 (sampling depth)/8 (conversion from bits to bytes). Accordingly, a set of 4096 bytes audio data, such as the audio data collected in the first audio buffer 103, can be expressed as an audio data sequence with 1024 sampling points:

$A4096=\{S0, S1, S2, \ldots, S1023\}$.

Each Sn in the sequence represents one sampling point.

Since each data packet can comprise data up to 1024 bytes, the 4096 bytes audio data needs to be divided into four data packets for transmission. In an embodiment of the present invention, when the audio data is encapsulated into data packets, the sampling points of the audio data are divided into four data packets in an interleaved manner, which is shown by the following four sets of audio data:

$P0=\{S0, S4, S8, \ldots, S1020\}$;

$P1=\{S1, S5, S9, \ldots, S1021\}$;

$P2=\{S2, S6, S10, \ldots, S1022\}$; and $P3=\{S3, S7, S11, \ldots, S1023\}$.

Each of the P0, P1, P2, and P3 denotes to the audio data in a packet. The audio data P0, P1, P2, and P3 are packetized conforming to the RTP and encapsulated into packets for transmission, which are denoted here as R0, R1, R2, and R3. As described above, the playback system 10 can perform wireless transmission of these packets complied with the IEEE 802.11 standard.

In order to reduce the risk of packet loss, according to an embodiment of the present invention, the packets R0, R1, R2, and R3 can be repeatedly transmitted sequentially: R0→R1→R2→R3→R0→R1→R2→R3. Therefore, even if any of the packets is lost during the transmission, the loudspeaker 200 still has a chance to receive the lost packet.

In another embodiment, the loudspeaker reconstructs the audio data when part of the audio data is lost during the wireless transmission from the multimedia data module. If more than two packets are lost during transmission, the lost data can still be compensated by interpolation as long as the loudspeaker 200 receives at least one packet. For example, if the loudspeaker 200 only receives the packet R0, that is, only audio data $P0=\{S0, S4, S8, \ldots, S1020\}$ is retrieved by the loudspeaker 200, a complete audio data sequence with 1024 sampling points can be reconstructed by interpolation:

$A4096'=\{S0, S1', S2', S3', S4, S5', S6', S7', S8 \ldots, S1020, S1021', S1022', S1023'\}$.

Each Sn' in the sequence represents the compensated sampling point reconstructed by interpolation and is filled in the sequence to replace the lost ones, wherein the calculations of the interpolation are:

if $n$ mod $4=1$ and $n<1021$, $Sn'=(3*Sn-1+Sn+3)/4$;

if $n$ mod $4=2$ and $n<1022$, $Sn'=(Sn-2+Sn+2)/2$;

if $n$ mod $4=3$ and $n<1023$, $Sn'=(Sn-1+3*Sn+3)/4$; and $S1021'=S1022'=S1023'=S1020$.

Therefore, according to an embodiment of the present invention, the method for synchronized playback of the present invention can reconstruct or compensate the audio data in the data packet lost during transmission by utilizing an algorithm, and reduce the packet loss rate in transmission at the same time.

In summary, the display device and the loudspeaker in the playback system can synchronously play the video data and the audio data by utilizing the method for synchronized playback of multimedia data of the present invention. The method and the playback system according to the present invention can not only packetize and wirelessly transmit the audio data, but also limit the transmission delay to be less than a certain threshold time (for example, 47 ms), thus achieving the objective of synchronously playing the multimedia data.

In addition, according to the embodiments of the present invention, the method for synchronized playback of multimedia data and the playback system using the same can further reduce the probability of data packet loss during wireless transmission by adopting packet retransmission. Moreover, the method for synchronized playback of multimedia data and the playback system using the same can further compensate for the lost audio data through an algorithm, thus desirably balancing the time delay and the data loss during transmission.

What is claimed is:

1. A method for synchronized multimedia playback, comprising the steps of:

receiving and processing multimedia data, wherein the multimedia data comprises video data and audio data;

packetizing an initial part of the audio data, transmitting the packetized initial part of the audio data to a loudspeaker wirelessly, and meanwhile holding an initial part of the video data on a display device for a threshold time, wherein the threshold time has been calculated based at least on a first time period to packetize an initial part of the audio data and a second period to receive and collect the initial part of the audio data at the loudspeaker;

playing the initial part of the video data on the display device in an instance in which the threshold time is satisfied and playing the initial part of the audio data on the loudspeaker in an instance in which the loudspeaker receives the initial part of the audio data; and playing a subsequent part of the audio data following the initial part of the audio data and a subsequent part of the video data following the initial part of the video data without recalculating the threshold time.

2. The method for synchronized multimedia playback according to claim 1, wherein the display device receives the multimedia data and processes the video data and the audio data, wherein the video data is storable in a video buffer, the video buffer being of reduced size in an instance in which the audio data is playing on the loudspeaker when compared to a size of a video buffer in an instance in which the audio data is played on the display device.

3. The method for synchronized multimedia playback according to claim 1, wherein the audio data is packetized for being transmitted to the loudspeaker in the first time period, and the audio data is received and collected by the loudspeaker in the second time period, and the length of the first time period is about equal to the second time period.

4. The method for synchronized multimedia playback according to claim 1, wherein the audio data is encapsulated into at least one data packet and then transmitted, the at least one data packet is repeatedly transmitted in a specific sequence, and when a part of the at least one data packets is lost during the transmission, the lost part of the at least one data packet are compensated by utilizing an compensation algorithm.

5. The method for synchronized multimedia playback according to claim 1, wherein the audio data is rearranged before being transmitted to the loudspeaker wirelessly.

6. The method for synchronized multimedia playback according to claim 1, further comprises compensating the audio data if part of the audio data is lost during the transmission to the loudspeaker.

7. A system for synchronized multimedia playback, comprising:

a multimedia data module used to receive and process multimedia data, the multimedia data comprising video data and audio data, and the multimedia data module wirelessly transmitting the audio data;

a display component connected to the multimedia data module to receive the video data for displaying; and a loudspeaker wirelessly connected to the multimedia data module to receive, collect and play the audio data;

wherein an initial part of the video data and an initial part of the audio data are displayed or played synchronously when a threshold time that the initial part of the video data is held is reached and the loudspeaker receives the initial part of the audio data meanwhile, wherein the threshold time has been calculated based at least on a first time period to packetize an initial part of the audio data and a second period to receive and collect the initial part of the audio data at the loudspeaker, and wherein a subsequent part of the audio data is played following the initial part of the audio data and a subsequent part of the video data is displayed following the initial part of the video data without recalculating the threshold time.

8. The system for synchronized multimedia playback according to claim 7, wherein the multimedia data module and the display component are located in a display device.

9. The system for synchronized multimedia playback according to claim 7, wherein the display component comprises a video buffer used to store the video data of the multimedia data, and the multimedia data module comprises a transmitter used to wirelessly transmit the audio data of the multimedia data to the loudspeaker, wherein the video buffer is of reduced size in an instance in which the audio data is playing on the loudspeaker when compared to a size of a video buffer in an instance in which the audio data is played on the display device.

10. The system for synchronized multimedia playback according to claim 7, wherein the loudspeaker comprises:

a receiver used to wirelessly receive the audio data from the multimedia data module;

an audio buffer coupled with the receiver and used to collect the audio data; and an audio player coupled with the audio buffer and used to receive and play the audio data output from the audio buffer.

11. The system for synchronized multimedia playback according to claim 10, wherein the receiver of the loudspeaker receives the audio data and transmits the audio data to the audio buffer for collection, and after finishing the collection of the audio data, the audio player receives the audio data from the audio buffer for playback.

12. The system for synchronized multimedia playback according to claim 7, wherein the multimedia data module rearranges the audio data before transmitting the audio data to the loudspeaker wirelessly.

13. The system for synchronized multimedia playback according to claim 7, wherein the loudspeaker reconstructs the audio data when part of the audio data is lost during the wireless transmission from the multimedia data module.

14. The system for synchronized multimedia playback according to claim 7, wherein the multimedia data module processes the video data and the audio data, and the multimedia data module starts to transmit the audio data to the loudspeaker before providing the video data to the display component.

15. A display device, used to process video data and audio data, comprising:

a multimedia data module used to receive and process the audio data and the video data, the multimedia data module packetizing the audio data for wireless transmission;

a video buffer used to receive and store the video data from the multimedia data module;

a transmitter used to receive the packetized audio data from the multimedia data module and wirelessly transmit the packetized audio data for playing; and a screen display used to receive the video data from the video buffer and play the video data;

wherein, an initial part of the audio data output by the transmitter, and an initial part of the video data are played synchronously when a threshold time that the initial part of the video data is held is reached and the initial part of the audio data output by the transmitter is ready for playing meanwhile, wherein the threshold time has been calculated based at least on a first time period to packetize an initial part of the audio data and a second period to receive and collect the initial part of the audio data at a loudspeaker, and wherein a subsequent part of the audio data is played following the initial part of the audio data and a subsequent part of the video data is displayed following the initial part of the video data without recalculating the threshold time.

16. The display device according to claim 15, wherein the multimedia data module rearranges the audio data when packetizing the audio data.

17. The display device according to claim 15, wherein the transmitter starts to transmit the audio data before the video buffer receives and stores the video data, wherein the video buffer is of reduced size in an instance in which the audio data is playing on the loudspeaker when compared to a size of a video buffer in an instance in which the audio data is played on the display device.

18. The display device according to claim 15, wherein the transmitter repeats transmitting the audio data.

19. The display device according to claim 15, wherein the video buffer is capable of temporarily storing three video frames.

20. The display device according to claim 15, wherein the multimedia module packetizes the audio data into at least one packet conforming to a real-time transport protocol.

* * * * *